(12) United States Patent
Arazaki

(10) Patent No.: US 8,752,928 B2
(45) Date of Patent: Jun. 17, 2014

(54) PRINT DATA GENERATION DEVICE, PRINT DATA GENERATION METHOD, AND PRINT DATA GENERATION PROGRAM

(75) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

(21) Appl. No.: 13/365,738

(22) Filed: Feb. 3, 2012

(65) Prior Publication Data

US 2012/0200627 A1 Aug. 9, 2012

(30) Foreign Application Priority Data

Feb. 4, 2011 (JP) ................................. 2011-022439

(51) Int. Cl.
*B41J 2/205* (2006.01)
(52) U.S. Cl.
USPC ................... 347/15; 347/14; 347/41; 347/19; 358/3.06; 358/3.2
(58) Field of Classification Search
USPC ................................................. 358/3.06–3.2
See application file for complete search history.

(56) References Cited

U.S. PATENT DOCUMENTS

| 6,315,387 | B1 * | 11/2001 | Horikoshi | ........................ | 347/40 |
| 6,695,433 | B2 * | 2/2004 | Sato et al. | ........................ | 347/41 |
| 6,793,321 | B2 | 9/2004 | Fujimori | | |
| 7,328,964 | B2 * | 2/2008 | Sakai et al. | ...................... | 347/19 |
| 7,357,473 | B2 | 4/2008 | Arazaki | | |
| 7,623,263 | B2 * | 11/2009 | Yoshida et al. | ................ | 358/1.8 |
| 2006/0214967 | A1 * | 9/2006 | Hoshii | ............................. | 347/15 |
| 2008/0030545 | A1 | 2/2008 | Iijima | | |
| 2010/0165032 | A1 * | 7/2010 | Yoshida | ......................... | 347/15 |
| 2012/0176449 | A1 | 7/2012 | Iijima | | |

FOREIGN PATENT DOCUMENTS

| CN | 101121341 A | 2/2008 |
| JP | 2002-225251 A | 8/2002 |
| JP | 2002-292908 A | 10/2002 |
| JP | 2003-145738 A | 5/2003 |
| JP | 2007-106066 A | 4/2007 |
| JP | 2007-230213 A | 9/2007 |
| JP | 2007-230218 A | 9/2007 |
| JP | 2010-120222 A | 6/2010 |

* cited by examiner

*Primary Examiner* — Manish S Shah
*Assistant Examiner* — Jeremy Delozier
(74) *Attorney, Agent, or Firm* — Global IP Counselors, LLP

(57) ABSTRACT

To suppress misalignment of a line formation position resulting from main scans being performed with different timings. A printer is made to perform a printing action of acquiring image data, printing a line during an $N^{th}$ (N being a natural number of 2 or more) main scan between other lines printed during an $N-1^{th}$ main scan and earlier main scans, and printing a print unit made of a plurality of lines in Nmax (Nmax being the maximum value of N) main scans; and print data is created based on the image data, the print data controlling the amount of ink discharged from the print head so that the amount of ink discharged based on the same tone value of the image data is greater in the $Nmax^{th}$ main scan than in the $Nmax-1^{th}$ main scan and earlier main scans and causing the printer to print an image indicated by the image data, the print data being generated based on the image data.

6 Claims, 4 Drawing Sheets

PRINT DATA GENERATION DEVICE, PRINT DATA GENERATION METHOD, AND PRINT DATA GENERATION PROGRAM

CROSS-REFERENCE TO RELATED APPLICATIONS

This application claims priority to Japanese Patent Application No. 2011-022439 filed on Feb. 4, 2011. The entire disclosure of Japanese Patent Application No. 2011-022439 is hereby incorporated herein by reference.

BACKGROUND

1. Technical Field

The present invention relates to a print data generation device for generating print data for causing a printer to print.

2. Background Technology

In an inkjet printer, a main scan is performed for moving a print head having a plurality of nozzles in a predetermined direction and discharging ink from the nozzles, a plurality of lines are printed on a print medium, and after the printing of the lines is complete, a sub scan is performed for moving the print head in a direction perpendicular to the predetermined direction, and printing is performed by repeating the main scan and the sub scan. A technique has been disclosed for printing a line during an $N^{th}$ main scan between lines printed during an $N-1^{th}$ main scan and previous main scans in order to achieve printing at a high resolution by printing dots at shorter spaces apart than the spaces between the nozzles (see Patent Citation 1, for example).

Japanese Patent Application Publication No. 2002-292908 (Patent Citation 1) is examples of the related art.

SUMMARY

Problems to be Solved by the Invention

In the technique of Patent Citation 1, it has not been possible to prevent the misalignment of line formation positions that occurs between lines printed with earlier timings and lines printed with later timings. Specifically, in an inkjet printer, when ink is printed on a print medium, the print medium readily stretches due to the ink seeping into the print medium; therefore, when printing of a plurality of lines is completed by a plurality of main scans, much ink has already been printed on the print medium by the time the final main scan is performed. Therefore, by the time the final main scan is performed, the print medium will have stretched beyond its normal size at the time of the preceding main scans, and there will be misalignment between the line formation positions in the main scans preceding the final main scan and the line formation positions in the final main scan. This misalignment is more pronounced the larger the print head and the more nozzles are formed in the print head. Therefore, this misalignment is particularly pronounced in a printer having print head large enough to print from one end to the other of the print medium. The invention was devised in view of such problems. It is an advantage thereof to provide a technique capable of suppressing misalignment of a line formation position resulting from the main scans being performed with different timings.

Means Used to Solve the Above-Mentioned Problems

To achieve the advantage described above, in the invention, print data is generated for controlling the amount of ink discharged from a print head so that the amount of ink discharged based on the same tone value of the image data is greater in the $Nmax^{th}$ main scan than in the $Nmax-1^{th}$ main scan and earlier main scans and causing the printer to print an image indicated by the image data. Specifically, a printing system is provided for forming an image by printing a line during an $N^{th}$ main scan between other lines printed during the $N-1^{th}$ main scan and earlier main scans, and for printing a print unit made of a plurality of lines in Nmax main scans, wherein the amount of ink is relatively lower in main scans preceding the final ($Nmax^{th}$) main scan.

If the print data generated by this configuration causes the printer to print, of all the main scans to be performed in order to complete the printing of the plurality of lines constituting the print unit, the amount of ink is relatively lower in main scans preceding the $Nmax^{th}$ main scan, stretching of the print medium caused by the ink printed in the main scans preceding the $Nmax^{th}$ main scan is less than in cases in which the amount of ink is equal in all main scans, and it is possible to suppress misalignment of line formation positions resulting from the main scans being performed with different timings.

The print data generation means is preferably capable of generating print data for causing the printer to print the image indicated by the image data so that the amount of ink indicated by the main scan sequence and the print data is associated with the main scan sequence. Specifically, pixels in which ink can be printed by the printer are specified according to the pixels indicated by the image data. The pixels in which ink can be printed by the printer are arranged in a two-dimensional plane, and pixels aligned in a predetermined direction constitute a line printed by a main scan. Specifically, in this printer, in which ink can be discharged from the print head whenever the print head and the print medium are relatively moved a unit movement distance in a predetermined direction, the movement in this predetermined direction constitutes a main scan, and a line printed by the main scan is composed of pixels aligned in a direction parallel to the predetermined direction in which ink can be printed by the main scan. When the print head and print medium are moved relatively in a direction perpendicular to the predetermined direction, this movement constitutes a sub scan.

In this configuration, wherein an image is formed by printing a line during an $N^{th}$ main scan between other lines printed during the $N-1^{th}$ main scan and earlier main scans, and a print unit composed of a plurality of lines is printed in Nmax main scans; more lines are formed between already printed lines to complete the printing of a print unit. In this case, main scans are performed in a predetermined sequence in order to complete the printing of a print unit, and a sequence is specified whereby the lines are printed in the printer in accordance with the main scan sequence. The print data is generated so that in the $Nmax-1^{th}$ main scan and earlier main scans which precede the $Nmax^{th}$ main scan, the amount of ink is relatively higher than the amount of ink in the $Nmax^{th}$ main scan.

The printer is preferably capable of forming an image by printing a line during an $N^{th}$ main scan between other lines printed during the $N-1^{th}$ main scan and earlier main scans. A typical example of a configuration that can be used is one that performs a printing action in which a main scan is performed in a state in which ink can be discharged from each of a plurality of nozzles by a print head in which the nozzles are formed aligned in the sub scan direction, and a main scan is then performed for forming another line between the lines printed by the first main scan. In this configuration, in a case in which M nozzles are aligned in one row in the sub scan direction on the print head and L lines are printed by Nmax main scans, L×M lines constitute a print unit.

The sequence for performing Nmax main scans is preferably determined before the print data is generated, the main scans can be performed so that a plurality of adjacent lines are printed in the sequence in which the lines are aligned, or the main scans can be performed so that the lines are printed in a sequence different from that in which the lines are aligned (a sequence in which lines are printed at a distance of one line or more away from already printed lines), and various configurations can be used.

Furthermore, the print data is preferably capable of actuating the printer so that the amount of ink discharged based on the same tone values of the image data is higher during the $Nmax^{th}$ main scan than during the $Nmax-1^{th}$ main scan and earlier main scans. The configuration is preferably designed so that in at least part of the range of the tone values of the image data, there is a difference between the amount of ink discharged by the $Nmax^{th}$ main scan and the amount of ink discharged by the $Nmax-1^{th}$ main scan and earlier main scans, the ink being discharged based on the same tone values of the image data. Of course, the configuration can also be designed so that there is a difference between the amount of ink discharged by the $Nmax^{th}$ main scan and the amount of ink discharged by the $Nmax-1^{th}$ main scan and earlier main scans throughout the entire range of tone values, the ink being discharged based on the same tone values of the image data.

Furthermore, the amount of ink discharged in the $Nmax^{th}$ main scan on the basis of the same tone values of the image data is preferably at least greater than the amount of ink discharged in the $Nmax-1^{th}$ main scan and earlier main scans, and as shall be apparent the configuration can be designed so that in the $Nmax-1^{th}$ main scan and earlier main scans, the amount of ink increases either linearly or nonlinearly every time the number of main scans increases. The amount of ink can be adjusted according to the tone values indicating the amount of ink, according to parameters of the halftone process, according to data for specifying the amount of ink droplets, or according to data for specifying the ink recording frequency; and various adjustment methods can be used.

Furthermore, the configuration for adjusting the amount of ink with each main scan by tone values indicating the amount of ink can be a configuration in which the color conversion table referenced in the color conversion process is changed with each main scan. Specifically, regulated in advance are a first color conversion table regulated so that the tone value of the output color coordinate system corresponding to the tone value of the input color coordinate system is a tone value indicating an amount of ink less than the standard amount of ink, and a second color conversion table regulated so that the tone value of the output color coordinate system corresponding to the tone value of the input color coordinate system is a tone value indicating a greater amount of ink than the standard amount of ink.

The first color conversion table is referenced for pixels on lines printed during $Nmax-1^{th}$ main scan and earlier main scans, and the second color conversion table is referenced for pixels on lines printed during the $Nmax^{th}$ main scan to convert the tone value of the input color coordinate system indicating a pixel color to a tone value of the output color coordinate system. According to this configuration, the amount of ink can be adjusted with each main scan by referencing the color conversion table corresponding to the main scan sequence and converting the color coordinate system.

Furthermore, the configuration for adjusting the amount of ink with each main scan by parameters of the halftone process can be a configuration in which the dither mask pattern is adjusted so that the amount of ink relatively fluctuates according to the number of main scans. For example, this configuration can be achieved by adjusting a threshold constituting a dither mask in accordance with the number of main scans in a so-called dither process in which the amounts of ink of a plurality of pixels are established by comparison of a threshold with tone values of adjacent pixels on the Nmax lines.

Specifically, in a possible configuration, the threshold is regulated so that the average value of the threshold compared with the pixels on lines printed during the $Nmax^{th}$ main scan yields a greater amount of ink per unit area than the average value of the threshold compared with pixels on lines printed during the $Nmax-1^{th}$ main scan, as a result of comparing the tone values of the pixels and the thresholds. For example, the configuration is designed so that the threshold is compared with tone values indicating that concentration is higher with greater numerical values, a dot is printed when the tone value is greater than the threshold, and a dot is not printed when the tone value is equal to or less than the threshold. In this configuration, the smaller the threshold, the more likely it will be concluded that a dot will be printed when the threshold is compared with the same tone value. Therefore, in this case, the average value of the threshold compared with the pixels on lines printed during the $Nmax^{th}$ main scan is preferably less than the average value of the threshold compared with the pixels on lines printed during the $Nmax-1^{th}$ main scan. According to the above configuration, performing the halftone process makes it possible to adjust the amount of ink in accordance with the number of main scans.

Furthermore, as an example of a configuration for adjusting the amount of ink with each main scan according to data for specifying the amount of ink droplets, a configuration can be used in which ink droplets of multiple sizes can be discharged from the nozzles provided to the print head of the printer, wherein an ink droplet-tone value establishment table is referenced in an ink droplet-tone value establishment process for converting tone values of the output color coordinate system to tone values of each size of ink droplet, and the table is changed with each main scan. Specifically, regulated in advance are a first ink droplet-tone value establishment table regulated so that the tone value of each size of ink droplet corresponding to the tone value of the output color coordinate system indicates an amount of ink less than the standard amount of ink, and a second ink droplet-tone value establishment table regulated so that the tone value of each size of ink droplet corresponding to the tone value of the output color coordinate system indicates a greater amount of ink than the standard amount of ink.

The first ink droplet-tone value establishment table is referenced for pixels on lines printed in $Nmax-1^{th}$ main scan and earlier main scans, and the second ink droplet-tone value establishment table is referenced for pixels on lines printed during the $Nmax^{th}$ main scan to convert the tone value of the output color coordinate system to the tone value of each size of ink droplet. According to this configuration, the amount of ink can be adjusted with each main scan by referencing the ink droplet-tone value establishment table corresponding to the main scan sequence to establish the tone value of each size of ink droplet.

Furthermore, when a print unit composed of a plurality of lines is printed by Nmax main scans as in the invention, a program or a method can be used to apply the procedure for controlling the amount of ink so that the amount of ink discharged based on the same tone value is greater in the $Nmax^{th}$ main scan than in the preceding main scans. While there are cases in which the device, program, and method described above are implemented as a single device, there are also cases in which shared components are used and implemented in a device having multiple functions, and such cases include various embodiments.

BRIEF DESCRIPTION OF THE DRAWINGS

Referring now to the attached drawings which form a part of this original disclosure.

DETAILED DESCRIPTION OF EXEMPLARY EMBODIMENTS

An embodiment of the invention is described in the following order.

(1) Configuration of Print Data Generation Device:
(1-1) Configuration of Printer:
(1-2) Configuration of Printer Driver and Print Control Process:
(2) Example of Generating Color Conversion Table:
(3) Other Embodiments:

(1) Configuration of Print Data Generation Device

Figure 1:
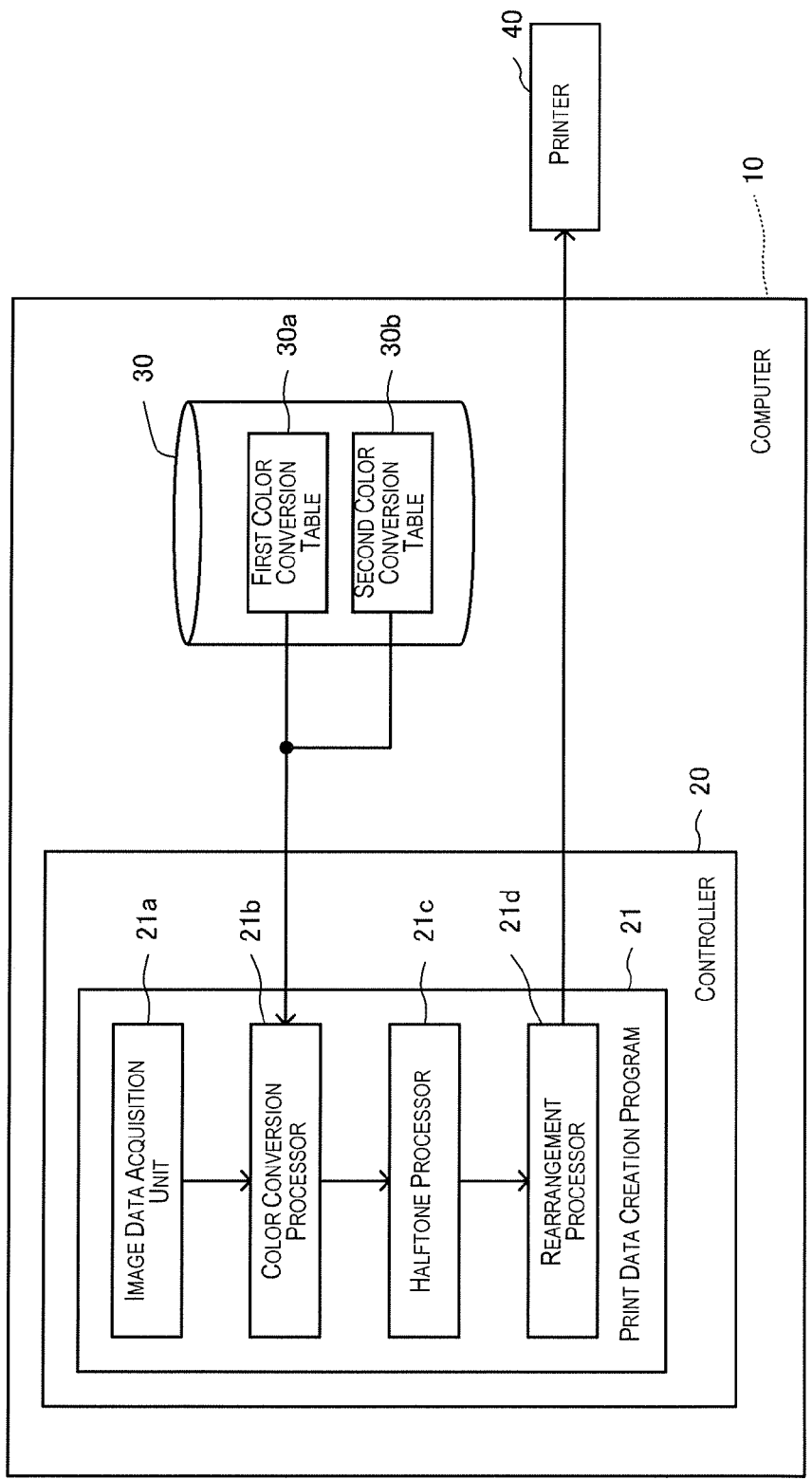
FIG. 1 is a block diagram of the print data generation device according to an embodiment of the invention.

FIG. 1 is a block diagram showing the configuration of a computer 10 that functions as the print data generation device according to the invention. The computer 10 includes a controller 20 having RAM, ROM, a CPU, and the like; and an HDD 30; wherein programs recorded on the ROM, the HDD 30, and other storage media can be run by the controller 20. In the present embodiment, a print data generation program 21 can be run as one of these programs. The print data generation program 21 has a function for causing a printer 40 connected to the computer 10 through an interface (not shown) to print while preventing stretching of the print medium and suppressing misalignment of line formation positions.

Figure 2A:
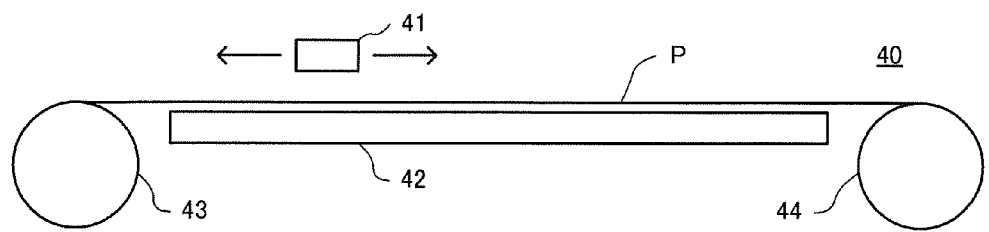
FIGS. 2A and 2B are drawings showing the schematic configuration of the printer.
Figure 2B:
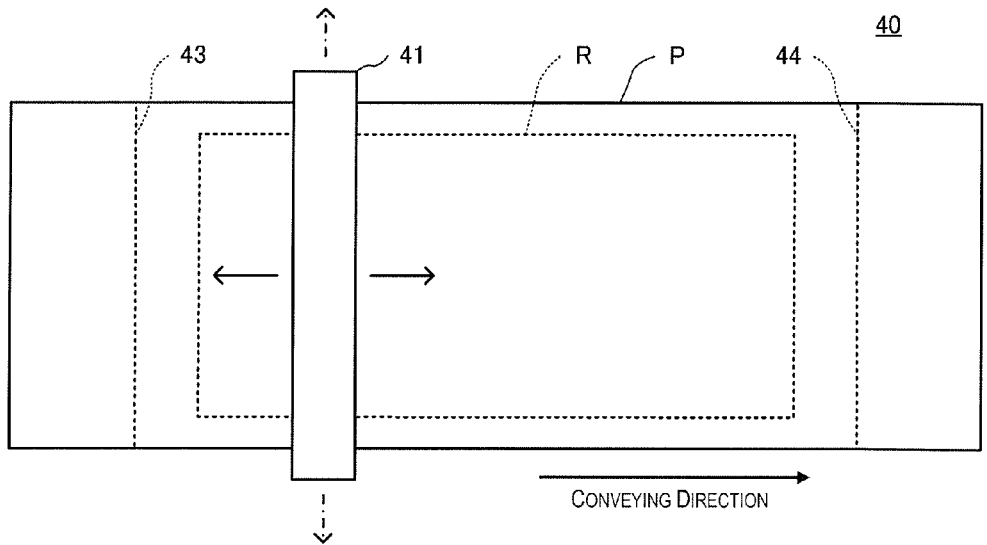

(1-1) Configuration of Printer:

FIGS. 2A and 2B are a side view and a top view showing the schematic configuration of the printer 40. In the present embodiment, the printer 40 has two rolls 43, 44, and a print medium P is stored on one roll 43 and wound on the other roll 44, whereby the print medium P can be conveyed over a platen 42. A print head 41 is provided above the platen 42, and the print head 41 is capable of moving parallel to (in the directions of the solid line arrows in FIGS. 2A and 2B) and perpendicular to (in the directions of the dotted line arrows in FIG. 2B) the conveying direction of the print medium P within a plane parallel to the print medium P on the platen 42.

Figure 2C:
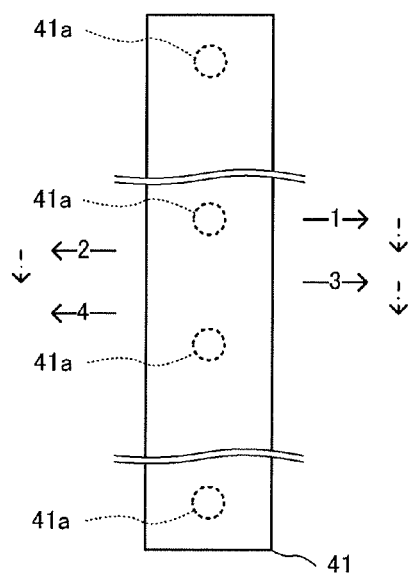
FIG. 2C is a drawing showing the schematic configuration of the print head.

The print head 41 has a plurality of nozzles formed therein, and ink droplets can be discharged from the nozzles. FIG. 2C is a drawing schematically showing a top view of the print head 41, wherein nozzles 41a opening in the bottom surface of the print head 41 are schematically shown by dashed lines. A plurality of the nozzles 41a are formed in the print head 41 along the direction in which the print head 41 extends, as shown in FIG. 2C. In the present embodiment, ink can be discharged from the nozzles 41a whenever the print head 41 is moved a unit distance in a direction (the directions of the solid line arrows shown in FIGS. 2A and 2B) perpendicular to the aligned direction of the nozzles 41a, and the action of moving the print head 41 in a direction perpendicular to the aligned direction of the nozzles 41a is referred to as main scan. When the print head 41 has reached an end of the movable range in the main scan direction, the print head 41 can be moved a unit distance in a direction (the directions of the dotted line arrows shown in FIG. 2B) parallel to the aligned direction of the nozzles 41a. After the print head 41 has been moved the unit distance, by again performing a main scan in the opposite direction, ink droplets can be printed on the print medium P at spaces smaller than the spaces between the nozzles 41a. The action of moving the print head 41 in a direction parallel to the aligned direction of the nozzles 41a is referred to as sub scan.

The entire length (the length in a direction perpendicular to the conveying direction of the print medium P) of the print head 41 of the printer 40 according to the present embodiment is greater than the entire width (the width in a direction perpendicular to the conveying direction of the print medium P) of the print medium P as shown in FIG. 2B, and ink can be printed in a rectangular print range R shown by dashed lines by repeating the above-described main scan and sub scan. The distance when the print head 41 performs a sub scan is ¼ the distance of the spaces between the nozzles 41a, whereby a print can be obtained having a resolution four times the pitch of the nozzles 41a in the sub scan direction.

In the printer 40 according to the present embodiment, as described above, ink can be printed on the print medium P whenever the print head 41 is moved a unit distance in the main scan direction by performing a main scan, and a plurality of pixels can be printed in the main scan direction. Since a plurality of the nozzles 41a are aligned on the print head 41 and the print head 41 is capable of moving in the sub scan direction, a plurality of pixels can also be printed in the sub scan direction. In the present embodiment, a plurality of pixels aligned in the main scan direction on the print medium P are referred to as a line. In image data (described hereinafter) representing an image to be printed on the print medium P, a plurality of pixels aligned in the same direction as the lines on the print medium P are also referred to as a line.

Figure 2D:
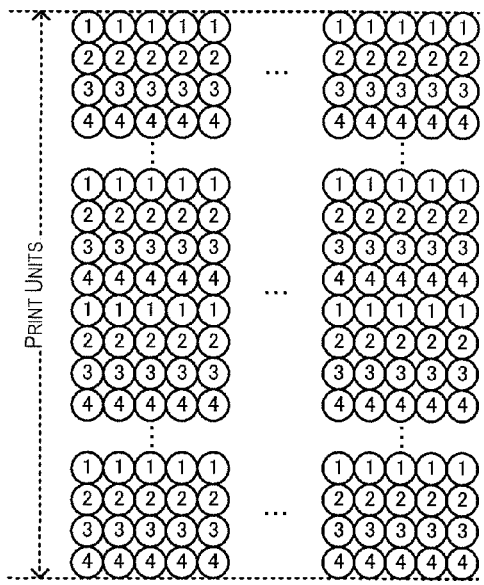
FIG. 2D is a drawing showing pixels printed on a print medium.
Figure 3:
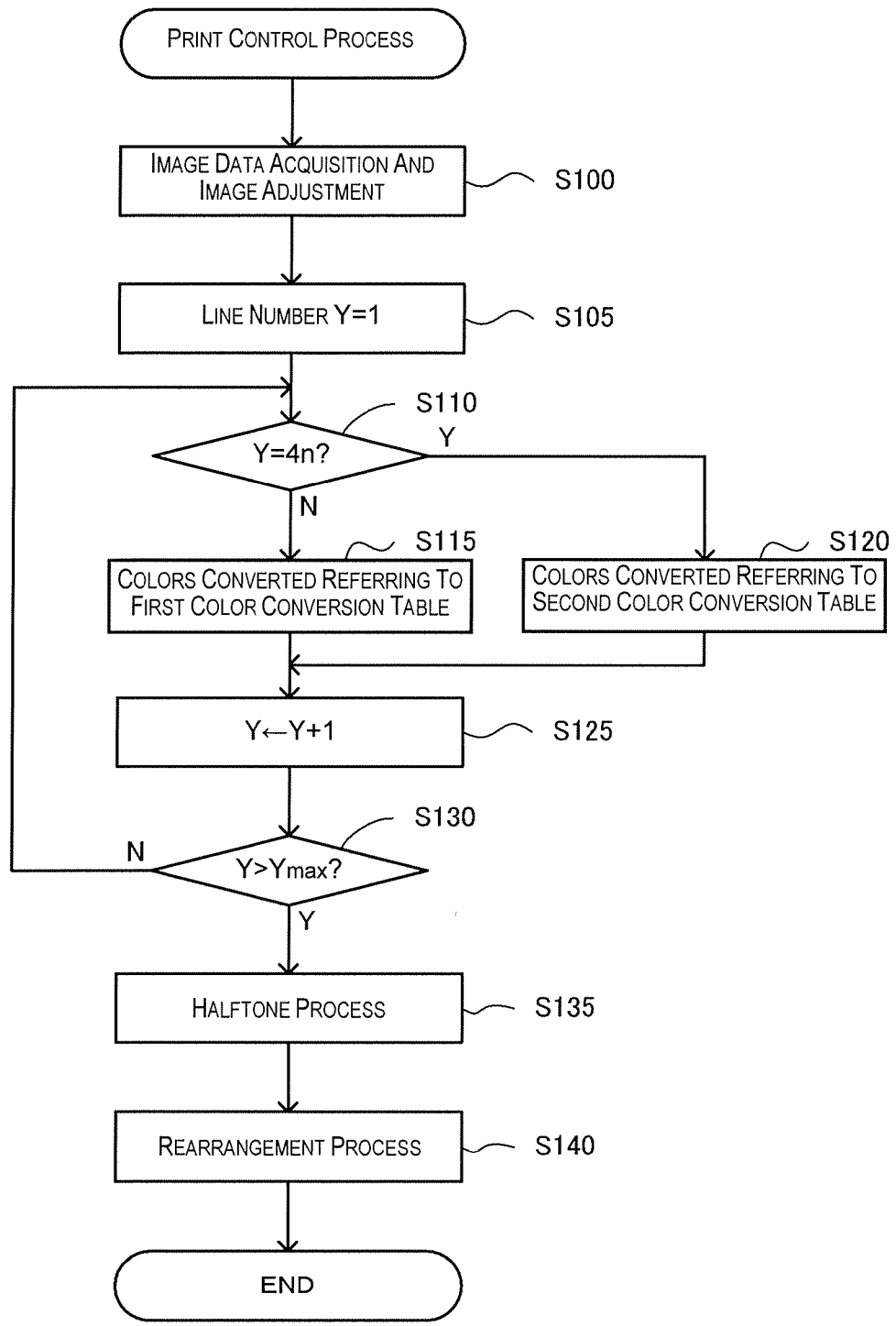
FIG. 3 is a flowchart of the print control process.

FIG. 2D schematically shows pixels as circles on the print medium P, wherein lines are formed by pluralities of pixels aligned horizontally, and a plurality of lines are aligned vertically. In the present embodiment, the distance when the print head 41 performs a sub scan as described above is ¼ the distance of the spaces between the nozzles 41a, whereby a print can be obtained having a resolution four times the pitch of the nozzles 41a in the sub scan direction. FIG. 2D shows an example of the sequence of main scans when a print is obtained having a resolution four times the pitch of the nozzles 41a in the sub scan direction. Specifically, in FIG. 2D, the sequence of the main scan is shown by the numbers inside the circles, and FIG. 2D shows an example in which printing progresses in order from the top line.

The example shown in FIG. 2D is an example of a printing operation wherein an image is formed by printing additional lines in an $N^{th}$ main scan (N being a natural number of 2 or greater) between lines printed in main scans of N−1 and below, and a print unit composed of a plurality of lines is printed in Nmax (Nmax being the maximum value of N) main scans. Specifically, in the example shown in FIG. 2D, additional lines shown by circles numbered as 2 are printed in the second main scan between the lines shown by circles numbered as 1 printed by the first main scan, additional lines shown by the circles numbered as 3 are printed in the third main scan between the lines shown by circles numbered as 1 and 2 printed by main scans up to the second, and additional lines shown by the circles numbered as 4 are printed in the fourth main scan between the lines shown by circles numbered as 3 and 1 printed by main scans up to the third. Lines are printed with no spaces therebetween in the sub scan direction by performing four main scans with the nozzles; therefore, when the number of nozzles is M, a print unit composed of 4×M lines is printed by four main scans. Such a printing is achieved by performing main scans in the sequence of the numbers affixed to the solid line arrows in the print head 41 shown in FIG. 2C, and performing sub scans shown by the single dotted lines after the main scans have ended, for example.

(1-2) Configuration of Printer Driver and Print Control Process:

The following is a description of the configuration and process of the print data generation program 21 for controlling the printer 40 described above. The print data generation program 21 includes an image data acquisition unit 21a, a color conversion processor 21b, a halftone processor 21c, and a rearrangement processor 21d. The print control process by the print data generation program 21 is initiated by a user using a user interface (not shown) to specify an image to be printed and issue a command to perform printing.

In this print control process, the controller 20 acquires image data by a process of the image data acquisition unit 21a, and adjusts the image to match the print resolution (step S100). Specifically, the controller 20 acquires image data representing an image according to the print command by a process of the image data acquisition unit 21a, and adjusts the number of pixels of the image data so that the printing as the default resolution. In the present embodiment, the number of pixels is adjusted so as to achieve a resolution four times the pitch of the nozzles 41a at least in the sub scan direction.

Next, the color conversion processor 21b causes the controller 20 to perform a color conversion process whereby an input color coordinate system, which is the color system of the image data, is converted to an output color coordinate system corresponding to the colors of ink that can be discharged by the printer 40. In the present embodiment, at the same time of the color conversion process, a process is performed for adjusting tone values so that the amount of ink discharged based on the same tone values of the image data is greater during the $\mathrm{Nmax}^{th}$ main scan than during the $\mathrm{Nmax}-1^{th}$ main scan and earlier main scans.

Specifically, the image data in the present embodiment is sRGB color system data that expresses the color of each pixel through a combination of tone values of the color components RGB. The input color coordinate system is therefore an sRGB color system. The printer 40 can discharge CMYK ink, and the color of each pixel on the print medium P is expressed through a combination of tone values of the color components CMYK. The output color coordinate system is therefore a CMYK color system.

The controller 20 in the present embodiment refers to a color conversion table through a process of the color conversion processor 21b and performs an interpolation calculation or the like to convert the color system of the pixels of the image data whose number of pixels was adjusted in step S100 from an sRGB color system to a CMYK color system. Furthermore, at this time, the color conversion table which differs with each line is referenced according to the number of main scans, whereby the tone values are adjusted so that the amount of ink discharged based on the same tone values of the image data is greater in the $\mathrm{Nmax}^{th}$ main scan than in the $\mathrm{Nmax}-1^{th}$ main scan and earlier main scans.

Therefore, in the present embodiment, recorded in advance on the HDD 30 are a first color conversion table 30a referenced when the sRGB tone values of image data representing pixels on lines printed in the $\mathrm{Nmax}-1^{th}$ main scan and earlier main scans are converted to CMYK tone values, and a second color conversion table 30b referenced when the sRGB tone values of image data representing pixels on lines printed during the $\mathrm{Nmax}^{th}$ main scan are converted to CMYK tone values. The first color conversion table and second color conversion table are preferably generated in advance and recorded on the HDD 30 before printing, and the generation method is described hereinafter.

In the first color conversion table in the present embodiment, the tone values of the output color coordinate system corresponding to the tone values of the input color coordinate system are regulated so as to be tone values that represent an ink amount less than a standard ink amount. In the second color conversion table, the tone values of the output color coordinate system corresponding to the tone values of the input color coordinate system are regulated so as to be tone values that represent an ink amount greater than the standard ink amount. Therefore, in a comparison between a case of conversion by the first color conversion table and a case of conversion by the second color conversion table, conversion in the latter yields a greater amount of ink discharged based on the same tone values of the image data.

In this state, the color conversion process is performed by the controller 20 performing steps S105 to S130 through the processes of the color conversion processor 21b. First, the controller 20 initializes a line number Y to 1 (step S105), the line number specifying the line of image data whose number of pixels was adjusted in step S100. Next, the controller 20 determines whether or not the line number Y is equal to 4n (n being a natural number (step S110). Specifically, in the present embodiment, the lines are printed in order from the top and four lines worth of printing is performed in four main scans as shown in FIG. 2D, whereby 4×M print units are printed by M nozzles. Therefore, in the present embodiment, the printing of one line is completed by one main scan. Therefore, the line whose line number Y is equal to 4n is the line printed by the fourth main scan, and the determination of step S110 determines whether or not the line of the line number Y is the line printed by the fourth main scan.

In step S110, when the line of the line number Y is determined to be equal to 4n, the controller 20 deems the line of the line number Y to be a line printed in the first through third main scan, and refers to the first color conversion table 30a to convert the sRGB tone values of the pixels on the line number Y to CMYK tone values (step S115). In step S110, when the line of the line number Y is determined to be equal to 4n, the controller 20 deems the line of the line number Y to be a line printed in the fourth main scan, and refers to the second color conversion table 30b to convert the sRGB tone values of the pixels on the line number Y to CMYK tone values (step S120).

When color conversion is performed in step S115 or S120, the controller 20 increments the line number Y (step S125) and determines whether or not Y is greater than the maximum value Ymax of the line number Y (step S130). The process of step S110 onward is repeated until Y is determined to be greater than the maximum value Ymax of the line number Y in step S130. Through the process described above, the CMYK tone values after color conversion are established so that the amount of ink discharged based on the same tone values of the image data is greater in the fourth main scan than in the first through third main scans.

Next, the controller 20 performs a halftone process through a process of the halftone processor 21c (step S135). Specifically, the controller 20 generates data representing whether or not ink droplets will be discharged for each pixel on the basis of the CMYK tone values after the color conversion described above.

Next, through a process of the rearrangement processor 21*d*, the controller 20 performs a rearrangement process for rearranging the data after the halftone process (step S140). Specifically, the controller 20 rearranges the pixel sequence so that pixels in which ink can be printed in each main scan are realigned in an earlier sequence. The controller 20 then generates print data so that the data for each pixel is sent to the printer 40 in the realigned sequence, and sends this print data to the printer 40. As a result, while a main scan is performed in the printer 40 in the sequence shown in FIGS. 2C and 2D, the amount of ink discharged from the print head is controlled and printing is performed so that the amount of ink discharged based on the same tone values of the image data is greater in the fourth main scan than in the first through third main scans.

Through the process described above, as the timing of main scan progresses from the first to the fourth, stretching of the print medium P caused by ink seeping into the medium can be suppressed, and it is possible to suppress misalignment of line formation positions resulting from the main scans being performed with different timings.

(2) Example of Generating Color Conversion Table

The following is a description of an example of generating the first color conversion table and second color conversion table described above. In the present embodiment, the first color conversion table is defined so that the tone values of the output color coordinate system corresponding to the tone values of the input color coordinate system will be tone values representing an amount of ink less than the standard amount of ink, and the second color conversion table is defined so that the tone values of the output color coordinate system corresponding to the tone values of the input color coordinate system will be tone values representing a greater amount of ink than the standard amount of ink. Color conversion is performed with reference both to the first color conversion table regulated so that the amount of ink is less than the standard amount of ink and to the second color conversion table regulated so that the amount of ink is greater than the standard amount of ink, whereby a color conversion table is generated so that printing is performed with the colors having been managed throughout the entire image.

Specifically, the first color conversion table and second color conversion table are generated by printing a plurality of color patches in advance and managing the colors. Specifically, standard CMYK tone values are first defined, which values are a combination of tone values for specifying the color patches. The standard CMYK tone values, which can be defined by combining all of the values obtained by equally dividing the tone values 0 to 255 for each of the colors CMYK, for example, are symbols whereby combinations of tone values of the colors CMYK specify the color patches. For example, if the standard CMYK tone values express that (C, M, Y, K)=(16, 16, 16, 16), the standard CMYK tone values (16, 16, 16, 16) are symbols representing the color patches printed when the standard CMYK tone values are specified.

Next, the standard CMYK tone values are converted by predetermined regulations to specify the CMYK tone values of each pixel of the color patches. The CMYK tone values of each pixel of the color patches are tone values that indicate when the color patches will actually be printed. Specifically, the above-described halftone process (step S135) and rearrangement process (step S140) are performed to generate print data on the basis of the CMYK tone values of each pixel of the color patches, and the color patches are printed based on the print data. Therefore, the color patches are printed based on CMYK tone values converted from the standard CMYK tone values, meaning that the standard CMYK tone values can be considered as specifying the standard amount of ink before conversion. It is therefore an acceptable assumption that if the standard CMYK tone values are converted to higher CMYK tone values, the amount of ink is increased above the standard amount of ink, and if the standard CMYK tone values are converted to lower CMYK tone values, the amount of ink is reduced below the standard amount of ink.

Figure 4A:
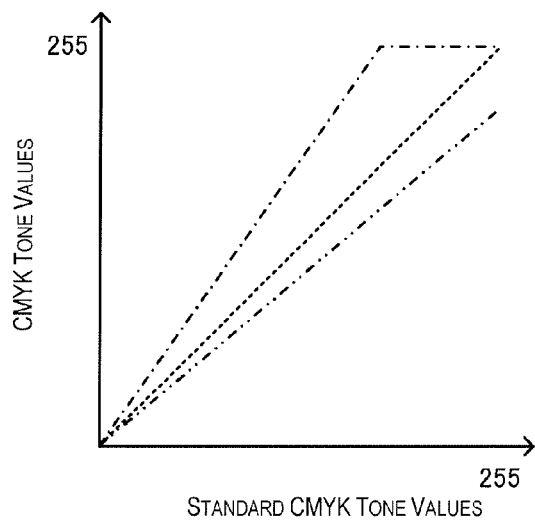
FIGS. 4A through 4C are diagrams for describing the configuration for adjusting the amount of ink in each main scan.

The graph shown in FIG. 4A, where the horizontal axis is standard CMYK tone values and the vertical axis is converted CMYK tone values, depicts a state shown by the single-dotted line wherein the amount of ink is greater than in a state of the standard CMYK tone values being equal to the CMYK tone values as shown by the dashed line, as well as a state shown by the double-dotted line wherein the amount of ink is less. The standard CMYK tone values are established for the plurality of color patches, an analysis is made to determine which main scan each line is printed in when the color patches are actually printed, the standard CMYK tone values are converted to CMYK tone values on the basis of the relationship shown by the double-dotted line in FIG. 4A for each pixel in the lines printed in the first main scan through the Nmax–$1^{th}$ main scan, and these converted CMYK tone values are the tone values of each pixel. For the pixels on the lines printed by the Nmax$^{th}$ main scan, the standard CMYK tone values are converted to CMYK tone values on the basis of the relationship shown by the single-dotted line in FIG. 4A.

The above-described halftone process (step S135) and rearrangement process (step S140) are performed based on the resulting CMYK tone values, and a plurality of color patches are printed. The printed plurality of color patches are correlated with the combinations of standard CMYK tone values on which the color patches were based, and the combinations of standard CMYK tone values are symbols that specify the color patches. If the color patches are measured to specify the sRGB tone values, the sRGB tone values can be correlated with the combinations of standard CMYK tone values for printing the colors of the sRGB tone values. If the combinations of standard CMYK tone values are specified, the CMYK tone values in each main scan are also specified based on the relationship shown in FIG. 4A.

A correlation between the sRGB tone values and the CMYK tone values of the lines printed in the first through Nmax–$1^{th}$ main scans is specified from the correlation between the sRGB tone values and the standard CMYK tone values, and the resulting correlation is defined as the first color conversion table. A correlation between the sRGB tone values and the CMYK tone values of the lines printed during the Nmax$^{th}$ main scan is also specified from the correlation between the sRGB tone values and the standard CMYK tone values, and the resulting correlation is defined as the second color conversion table. As a result of the above, it is possible to create a color conversion table for each main scan.

(3) Other Embodiments

The embodiment described above is one example for implementing the invention, and various other embodiments can be used as long as it is possible to control the amount of ink so that the amount of ink discharged based on the same tone values is greater in the Nmax$^{th}$ main scan than in the preceding main scans, in cases in which a print unit composed of a plurality of lines is printed in Nmax main scans. For example, by using the halftone process, the amount of ink discharged from the print head can be controlled so that the amount of ink discharged based on the same tone values of the image data is greater in the $\text{Nmax}^{th}$ main scan than in the $\text{Nmax}-1^{th}$ main scan and earlier main scans.

Figure 4B:
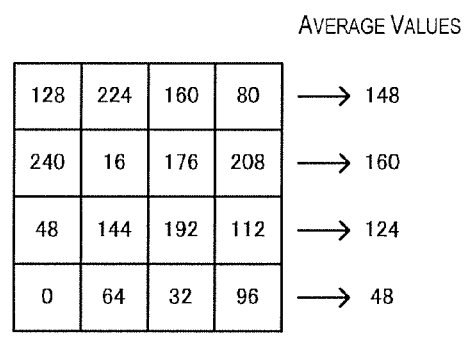

Specifically, in the embodiment described above, one color conversion table is prepared in advance, and this one color conversion table is referenced to perform the color conversion process without changing the referenced color conversion table depending on the number of main scans. The halftone process is performed so that the amount of ink corresponds to the number of main scans. FIG. 4B is a chart showing an example of a dither mask for performing the halftone process. The example shown in FIG. 4B is an example of a dither mask that can be applied to a configuration for printing 4×M print units with M nozzles by printing lines in order from the top and print four lines in four main scans as shown in FIG. 2D.

Specifically, the dither mask shown in FIG. 4B defines thresholds compared with tone values of the output color coordinate system, and thresholds corresponding to 4×4 pixels are shown in rectangles arranged four vertically and four horizontally. For example, since the threshold shown in the upper left in FIG. 4B is 128, it is concluded that when the tone value of the output color coordinate system of the pixel compared with this threshold is greater than 128, a dot is printed in this pixel, and when the tone value of the output color coordinate system of the pixel compared with this threshold is less than 128, a dot is not printed in this pixel.

In this dither mask, the pixels and thresholds are compared while moving in the main scan direction, and the thresholds on the uppermost line shown in FIG. 4B are compared with the pixels on the line printed in the first main scan in the printing action shown in FIG. 2D. Similarly, the thresholds on the second line from the top shown in FIG. 4B are compared with the pixels on the line printed in the second main scan, the thresholds on the third line from the top are compared with the pixels on the line printed in the third main scan, and the thresholds on the lowermost line are compared with the pixels on the line printed in the fourth main scan.

The dither mask shown in FIG. 4B is configured so that each of the numerical values obtained by dividing the tone value range of 255 into 16 equal parts is designated as a threshold, and the average value (48) of the threshold on the lowermost line shown in FIG. 4B is less than the average value (148) of the thresholds on the uppermost line, the average value (160) of the thresholds on the second line from the top, and the average value (124) of the thresholds on the third line from the top. Therefore, by applying the dither mask shown in FIG. 4B to the tone values of the output color coordinate system for printing in the main scan sequence shown in FIG. 2D and performing the halftone process, the print data can be adjusted so that the amount of ink is greatest in the fourth main scan.

Furthermore, in cases in which ink droplets of different sizes can be discharged from the nozzles 41a provided to the print head 41, a process for converting the tone values of the output color coordinate system to the tone values of each size of ink droplet is performed either before the halftone process or during the halftone process, and conversion can therefore be performed during this process so that the amount of ink discharged based on the same tone values of the image data is greater in the $\text{Nmax}^{th}$ main scan than in the $\text{Nmax}-1^{th}$ main scan and earlier main scans.

For example, a possible configuration is one in which the CMYK tone values of each color obtained by the color conversion process are converted to tone values of each color and each size of ink droplet, a dither process, error diffusion process, or the like is performed based on the tone values of each size of ink droplet, and whether or not there is a discharge of each size of ink droplet is established with each pixel. In this configuration, an ink droplet-tone value establishment table regulating the correlation between the tone values of the output color coordinate system and the tone values of each size of ink droplet is referenced to convert the CMYK tone values of each color to tone values of each color and each size of ink droplet.

Furthermore, a plurality of various ink droplet-tone value establishment tables are prepared in advance according to the number of main scans. Specifically, a first ink droplet-tone value establishment table is prescribed in advance so that the tone values of each size of ink droplet corresponding to the tone values of the output color coordinate system are tone values that represent an amount of ink less than the standard amount of ink, and a second ink droplet-tone value establishment table is prescribed in advance so that the tone values of each size of ink droplet corresponding to the tone values of the output color coordinate system are tone values that represent a greater amount of ink than the standard amount of ink.

In the embodiment described above, one color conversion table is prepared in advance, and when this one color conversion table is referenced to perform the color conversion process and obtain CMYK tone values of the output color coordinate system without changing the referenced color conversion table depending on the number of main scans, a line of pixels expressed by the CMYK tone values of the output color coordinate system is specified. Furthermore, it is determined based on the line number Y whether the line number Y will be printed the $\text{Nmax}-1^{th}$ main scan and earlier main scans or in the $\text{Nmax}^{th}$ main scan, and for pixels on the lines printed in the $\text{Nmax}-1^{th}$ main scan and earlier main scans, the first ink droplet-tone value establishment table is referenced to establish the tone values of each size of ink droplet. For pixels on the line printed during the $\text{Nmax}^{th}$ main scan, the second ink droplet-tone value establishment table is referenced to establish the tone values of each size of ink droplet.

The halftone process is then performed based on the tone values of each size of ink droplet and the rearrangement process is performed to cause the printer 40 to print, whereby the amount of ink can be adjusted for each main scan. For example, when printing is performed in the main scan sequence shown in FIG. 2D, the tone values of each size of ink droplet are established based on the first ink droplet-tone value establishment table for pixels on lines printed in the first through third main scans, and based on the second ink droplet-tone value establishment table for pixels on the line printed in the fourth main scan. As a result, the print data can be adjusted so that the amount of ink is greatest in the fourth main scan.

Figure 4C:
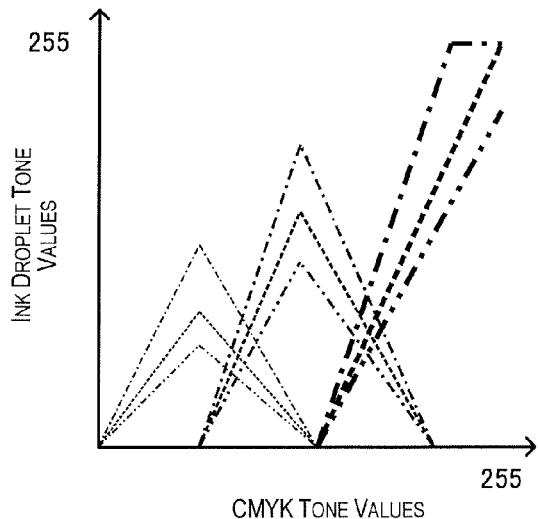

Furthermore, the method of generating the first ink droplet-tone value establishment table and the second ink droplet-tone value establishment table can be a method that resembles the method of generating the first color conversion table and second color conversion table described above. FIG. 4C shows an example of an ink droplet-tone value establishment table referenced in a case in which the size of ink droplets discharged from each of the nozzles can be adjusted among three levels: large, medium, and small. FIG. 4C is a graph showing CMYK tone values on the horizontal axis and ink droplet tone values on the vertical axis, wherein ink droplet tone values corresponding to CMYK tone values are shown. The ink droplet tone values are defined for each of the three levels of ink droplet size, and the thinnest lines show correlations between CMYK tone values and ink droplet tone values when the ink droplet size is small, the second thinnest lines show correlations when the ink droplet size is medium, and the thickest lines show correlations when the ink droplet size is large.

Furthermore, in FIG. 4C, the dashed lines show correlations in cases in which the amount of ink specified by the tone values of each size of ink droplet is defined so as to be the standard amount of ink. After the combinations of CMYK tone values have been established for the plurality of color patches, an analysis is made to determine which main scan each line is printed in when the color patches are actually printed, the CMYK tone values are converted to tone values of each size of ink droplet on the basis of the relationships shown by the double-dotted lines rather than the dashed lines in FIG. 4C for each pixel in the lines printed in the first main scan through the $Nmax-1^{th}$ main scan, and these converted tone values are the tone values of each pixel. For the pixels on the lines printed by the $Nmax^{th}$ main scan, the CMYK tone values are converted to tone values of each size of ink droplet on the basis of the relationship shown by the single-dotted line rather than the dashed line in FIG. 4C.

The halftone process and rearrangement process described above are then performed based on the resulting tone values of each size of ink droplet, and a plurality of color patches are printed. If the color patches are measured and the sRGB tone values are specified, the sRGB tone values can be correlated with the combinations of CMYK tone values for printing the colors of the sRGB tone values. If the combinations of CMYK tone values are specified, the correlation between the CMYK tone values and the tone values of each size of ink droplet can be specified for each main scan, and the first ink droplet-tone value establishment table and second ink droplet-tone value establishment table can be generated. The adjustment from the standard amount of ink as shown in FIG. 4C is one example, and other various adjustments can be made as long as the adjustments are within the limits of the number or amount of ink droplets that can be recorded per unit area. For example, the configuration can be such that when an ink droplet-tone value establishment table is generated for lines printed during the $Nmax^{th}$ main scan, the ink droplet tone values of small ink droplets are reduced below the tone values that yield the standard amount of ink, and the ink droplet tone values of medium and large ink droplets are increased above the tone values that yield the standard amount of ink.

Furthermore, the controller 20 for performing the print control process described above can be provided to the printer 40. For example, the configuration can be such that image data recorded on a computer or recording media is sent to the printer 40, and based on the sent image data, the printer 40 generates print data so that printing is performed with an amount of ink corresponding to the number of main scans.

Furthermore, in the embodiment described above, a configuration was used in which the amount of ink is relatively reduced in the $Nmax-1^{th}$ main scan and earlier main scans, the amount of ink is relatively increased in the $Nmax^{th}$ main scan, and both achieve equilibrium, thereby preventing loss of image quality, but other various configurations can also be used in order to increase the amount of ink in the $Nmax^{th}$ main scan above the amount of ink in the previous main scans. For example, the pixels to be printed in the $Nmax-1^{th}$ main scan and earlier main scans can be thinned out.

What is claimed is:

1. A print data generation device comprising:
    an image data acquisition unit configured to acquire image data; and
    a print data generation unit configured to cause a printer to perform a printing action of printing a line during an $N^{th}$ (N being a natural number of 2 or greater) main scan between other lines printed during an $N-1^{th}$ main scan and printing a print unit including a plurality of lines during the $N-1^{th}$ main scan to an $Nmax^{th}$ (Nmax being a maximum value of N) main scan, the $Nmax^{th}$ main scan being a final main scan performed to print the print unit, and to generate print data for controlling the amount of ink discharged from a print head so that the amount of ink discharged based on the same tone value of the image data during the $Nmax^{th}$ main scan is greater than the amount of ink discharged based on the same tone value of the image data during each of the $Nmax-1^{th}$ main scan and earlier main scans, the earlier main scans being earlier than the $Nmax-1^{th}$ main scan and preformed to print the print unit, and for causing the printer to print an image indicated by the image data, the print data being generated based on the image data;
    each of the lines being printed by one main scan.

2. The print data generation device according to claim 1, the print data generation unit performing a color conversion process for:
    referencing a first color conversion table regulated so that the tone value of an output color coordinate system that corresponds to the color of ink capable of being discharged by the printer, the tone value corresponding to a tone value of an input color coordinate system constituting a color coordinate system of the image data, is a tone value indicating an amount of ink less than a standard amount of ink, and converting the tone value of the input color coordinate system indicating the color of a pixel to the tone value of the output color coordinate system for pixels on lines printed during the $Nmax-1^{th}$ main scan and earlier main scans; and
    referencing a second color conversion table regulated so that the tone value of the output color coordinate system corresponding to the tone value of the input color coordinate system is a tone value indicating a greater amount of ink than the standard amount of ink, and converting the tone value of the input color coordinate system indicating the color of a pixel to the tone value of the output color coordinate system for pixels on lines printed during the $Nmax^{th}$ main scan.

3. The print data generation device according to claim 1;
    wherein the print data generation unit performs a halftone process for:
    establishing the amounts of ink of a plurality of pixels by referencing a threshold whereby the amounts of ink of the pixels are established by comparison with the tone values of pixels adjacent on each of the Nmax lines, the threshold being regulated so that the average value of the threshold compared with the pixels on lines printed during the $Nmax^{th}$ main scan yields a greater amount of ink per unit area than the average value of the threshold compared with pixels on lines printed during the $Nmax-1^{th}$ main scan.

4. The print data generation device according to claim 1;
    wherein the print data generation unit performs an ink droplet-tone value establishment process for:
    referencing a first ink droplet-tone value establishment table regulated so that the tone value for each size of ink droplet capable of being discharged from the nozzles of the printer, the tone value corresponding to the tone value of an output color coordinate system corresponding to colors of ink capable of being discharged by the printer, is a tone value indicating an amount of ink less than the standard amount of ink, and converting the tone value of the output color coordinate system indicating the color of a pixel to the tone value of each size of ink droplet for pixels on lines printed during the Nmax−1$^{th}$ main scan and earlier main scans; and referencing a second ink droplet-tone value establishment table regulated so that the tone value of each size of ink droplet corresponding to the tone value of the output color coordinate system indicates a greater amount of ink than the standard ink, and converting the tone value of the output color coordinate system indicating the color of a pixel to the tone value of each size of ink droplet for pixels on lines printed during the Nmax$^{th}$ main scan.

5. A print data generation method comprising:

acquiring image data; and causing a printer to perform a printing action of printing a line during an N$^{th}$ (N being a natural number of 2 or greater) main scan between other lines printed during an N−1$^{th}$ main scan and printing a print unit made of a plurality of lines during the N−1$^{th}$ main scan to an Nmax$^{th}$ (Nmax being a maximum value of N) main scan, the Nmax$^{th}$ main scan being a final main scan performed to print the print unit, and generating print data for controlling the amount of ink discharged from a print head so that the amount of ink discharged based on the same tone value of the image data during the Nmax$^{th}$ main scan is greater than the amount of ink discharged based on the same tone value of the image data during each of the Nmax−1$^{th}$ main scan and earlier main scans the earlier main scans being earlier than the Nmax−1$^{th}$ main scan and preformed to print the print unit, and for causing the printer to print an image indicated by the image data, the print data being generated based on the image data, each of the lines being printed by one main scan.

6. A print data generation program for causing a computer to implement:

an image data acquisition function for acquiring image data; and a print data generation function for causing a printer to perform a printing action of printing a line during an N$^{th}$ (N being a natural number of 2 or greater) main scan between other lines printed during an N−1$^{th}$ main scan and printing a print unit made of a plurality of lines during the N−1$^{th}$ main scan to an Nmax$^{th}$ (Nmax being a maximum value of N) main scan, the Nmax$^{th}$ main scan being a final main scan performed to print the print unit, and for generating print data for controlling the amount of ink discharged from a print head so that the amount of ink discharged based on the same tone value of the image data during the Nmax$^{th}$ main scan is greater than the amount of ink discharged based on the same tone value of the image data during each of the Nmax−1$^{th}$ main scan and earlier main scans, the earlier main scans being earlier than the Nmax−1$^{th}$ main scan and preformed to print the print unit, and for causing the printer to print an image indicated by the image data, the print data being generated based on the image data, each of the lines being printed by one main scan.

* * * * *